July 28, 1970 O. LINDSTROM 3,522,100
FUEL CELL BATTERY

Filed Dec. 18, 1967 7 Sheets-Sheet 1

INVENTOR.
OLLE LINDSTROM
BY

INVENTOR.
OLLE LINDSTROM
BY
Jennings Bailey Jr

July 28, 1970  O. LINDSTROM  3,522,100
FUEL CELL BATTERY

Filed Dec. 18, 1967  7 Sheets-Sheet 4

INVENTOR.
OLLE LINDSTROM
BY
Jennings Bailey Jr

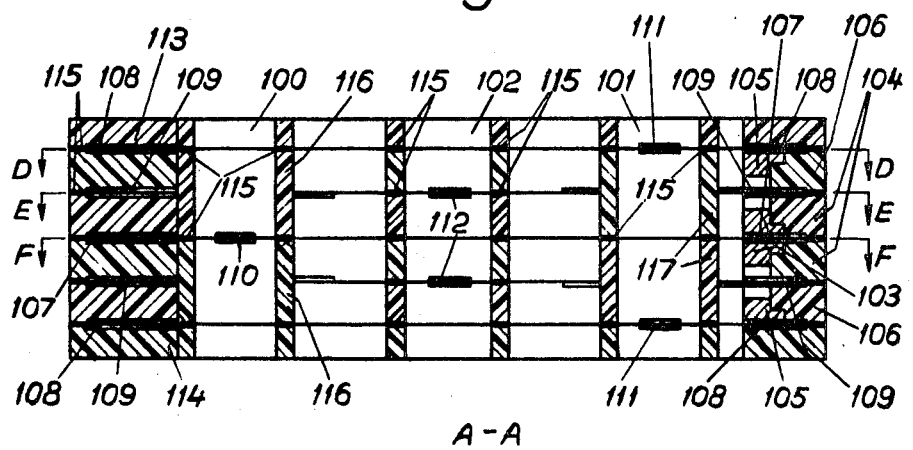
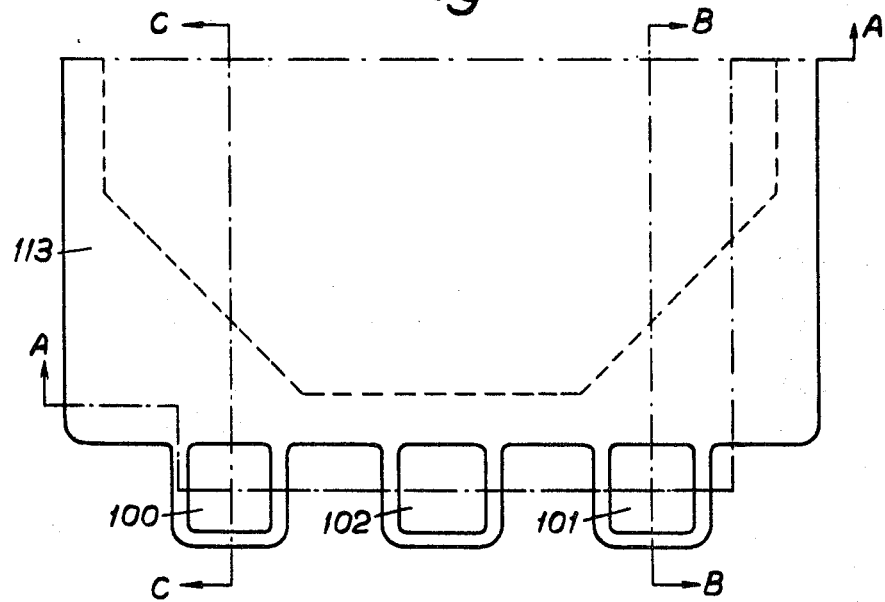

B-B

C-C

INVENTOR.
OLLE LINDSTROM
BY

United States Patent Office 3,522,100
Patented July 28, 1970

---

3,522,100
FUEL CELL BATTERY
Olle Lindstrom, Vasteras, Sweden, assignor to Allmänna
  Svenska Elektriska Aktiebolaget, Vasteras, Sweden, a
  Swedish corporation
Filed Dec. 18, 1967, Ser. No. 691,466
Claims priority, application Sweden, Dec. 19, 1966,
17,328/66
Int. Cl. H01m 27/00
U.S. Cl. 136—86                                8 Claims

ABSTRACT OF THE DISCLOSURE

A fuel cell battery comprising several electrode elements each comprising a frame and a central active electrode, which elements are stacked to form a body with intermediate spaces between said electrodes and with sealing connections arranged between adjacent frames to form the boundary of the intermediate space therebetween, the frames having aligned holes therein forming channels connected to the intermediate spaces for delivery of gaseous fuel, gaseous oxidant and electolyte wherein the fuel channel for the delivery of the gaseous fuel is arranged in connection with spaces, fuel spaces, which at least on one side are limited by a fuel electrode, the oxidant channel for the delivery of the gaseous oxidant is arranged in connection with spaces, oxidant spaces, which at least on one side are limited by an oxidant electrode and the electrolyte channel for the supply of the electrolyte is arranged in connection with spaces, electrolyte spaces, between a fuel electrode and an oxidant electrode. A barrier space is arranged between frame parts situated nearest to and limiting the oxidant channel and adjacent frame parts limiting the fuel spaces and another barrier space is arranged between frame parts situated nearest to and limiting the fuel channel and adjacent frame parts limiting the oxidant spaces, which barrier spaces are sealed with respect to the oxidant and fuel channels, respectively and with respect to the fuel and oxidant spaces, respectively, and in which barrier spaces a material is arranged which prevents leakage of oxidant and/or fuel into the barrier spaces or prevents oxidant and fuel which has leaked into the barrier spaces from reacting with each other.

BACKGROUND OF THE INVENTION

Field of the invention

The invention relates to the construction of a fuel cell battery.

The prior art

A fuel cell battery usually consists of a number of electrode elements and often also cooling elements stacked to form a battery. One element may then consist of a centrally arranged active part, preferably in the form of a plate attached in a surrounding frame which may be of a synthetic resin. The frames of the elements are provided with holes running in the stacking direction. These holes, together with sealing elements arranged between the holes, act as channels for the supply of fuel, oxidant and electrolyte to the spaces between the plates where the medium in question is to be led. For external sealing usually sealing rings are arranged between the frames just inside their outer edges. The elements are held together to a unit with the help of end plates joined to each other by means of long bolts.

When frames of a thermoplastic resin are used it is known to effect sealing between adjacent frames by melting the resin in the region around the holes which form the channels for the supply of fuel, oxidant and electrolyte and by melting the resin at or just inside the outer edges, in the last-mentioned case to effect external sealing.

A serious problem with fuel cells of the types described has been to prevent leakage of gaseous fuel from the fuel channels or fuel spaces to the oxidant channels or oxidant spaces of the battery and to prevent leakage of gaseous oxidant from the oxidant channel or oxidant spaces to the fuel channels or fuel spaces of the battery. When the fuel consists of, for example, hydrogen and the oxidant of, for example, oxygen or chlorine gas, apart from the serious consequences connection with the operation of the battery, great risks of explosions arise due to such leakage.

SUMMARY OF THE INVENTION

These disadvantages in previously known batteries are avoided according to the present invention in which, between a fuel channel or space containing fuel and an oxidant channel or space containing oxidant, two separating walls are arranged between which is a barrier space in which a material is arranged which prevents leakage of fuel and/or oxidant into the barrier space or which can remove fuel or oxidant which has leaked into the barrier space.

The invention relates to a fuel cell battery comprising several electrode elements, each of said electrode elements comprising a frame and a central active electrode fixed in said frame, which elements are stacked to form a body with intermediate spaces between said electrodes and with sealing connections arranged between adjacent frames to form the boundary of the intermediate space therebetween, said frames having aligned holes therein forming channels therein extending substantially perpendicularly to the electrode elements for the supply of gaseous fuel, gaseous oxidant, electrolyte and possibly coolant to the spaces wherein one channel, the fuel channel, for the supply of the gaseous fuel is arranged in connection with spaces, fuel spaces, which at least on one side are limited by an electrode element with an electrode which is active in a reaction between the fuel and the electrolyte, one channel, the oxidant channel, for the supply of the gaseous oxidant is arranged in connection with spaces, oxidant spaces, which at least on one side are limited by an electrode element with an electrode which is active in a reaction between the oxidant and the electrolyte and one channel, the electrolyte channel, for the supply of the electrolyte is arranged in connection with spaces, electrolyte spaces, between an electrode element with an electrode which is active in a reaction between the fuel and the electrolyte and an electrode element with an electrode which is active in a reaction between the oxidant and the electrolyte characterised in that a barrier space is arranged between frame parts situated nearest to and limiting the oxidant channel and adjacent frame parts limiting the fuel spaces which barrier space is sealed with respect to the oxidant channel and to the fuel spaces and in which a material is arranged which prevents leakage of oxidant and/or fuel into the barrier space or prevents oxidant and fuel which has leaked into the barrier space from reacting with each other and that a barrier space is arranged between frame parts situated nearest to and limiting the fuel channel and adjacent frame parts limiting the oxidant spaces which barrier space is sealed with respect to the fuel channel and to the oxidant spaces and in which a material is arranged with prevents leakage of oxidant and/or fuel into the barrier space or prevents oxidant and fuel which has leaked into the barrier space from reacting with each other. The fuel cell battery may also comprise cooling elements each consisting of a frame and a central active cooling member fixed in said frame which are stacked with the electrode elements.

According to the invention the fuel channel can be limited only by frame parts in electrode elements or cooling elements without contact with oxidant and the oxidant channel can be limited only by frame parts in electrode elements or cooling elements without contact with the fuel.

The frames of the elements may with advantage be made entirely of a thermoplastic resin material such as polyethylene, polypropylene, fluorocarbon thermoplastic resins, chlorinated polyethers, polyvinylchloride, nylon, and the like. The frames may be reinforced with glass fibres, textile, metal structure or in some other way to prevent shrinkage and increase the strength.

The material arranged in the barrier space may be solid; liquid or gaseous. If it is solid it may consist, for example, of a casting resin, for example an epoxy resin which has been cured into a solid body in the barrier space. The body of casting resin forms an extra wall between the fuel and oxidant which decreases the risk of fuel and oxidant coming into contact with each other. The use of a solid material such as a body of casting resin provides increased mechanical stability in the battery.

If the material arranged in the barrier space is liquid or gaseous it is suitable to make it transportable through the barrier space so that oxidant and fuel which has leaked into the barrier space can be removed. As liquid medium the electrolyte of the battery can be used, among other things, or some other medium, for example water in which the fuel and oxidant can be taken up without being able to react with each other. As gaseous material nitrogen and carbon dioxide can be used, among others, which can take up fuel and oxidant without these being able to react with each other.

BRIEF DESCRIPTION OF THE DRAWINGS

The invention will be explained more fully by describing a number of embodiments with reference to the accompanying drawing in which

FIGS. 7–13 show a fuel cell battery in which a medium other than the electrolyte, or a solid medium or a gaseous medium can be used as material in the barrier space between frame parts limiting spaces containing fuel and frame parts limiting spaces containing oxidant. In the figures only a small number of electrode and cooling elements is used to make the description as clear as possible. In practice a much greater number of elements is used.

DESCRIPTION OF THE PREFERRED EMBODIMENTS

Figure 1:
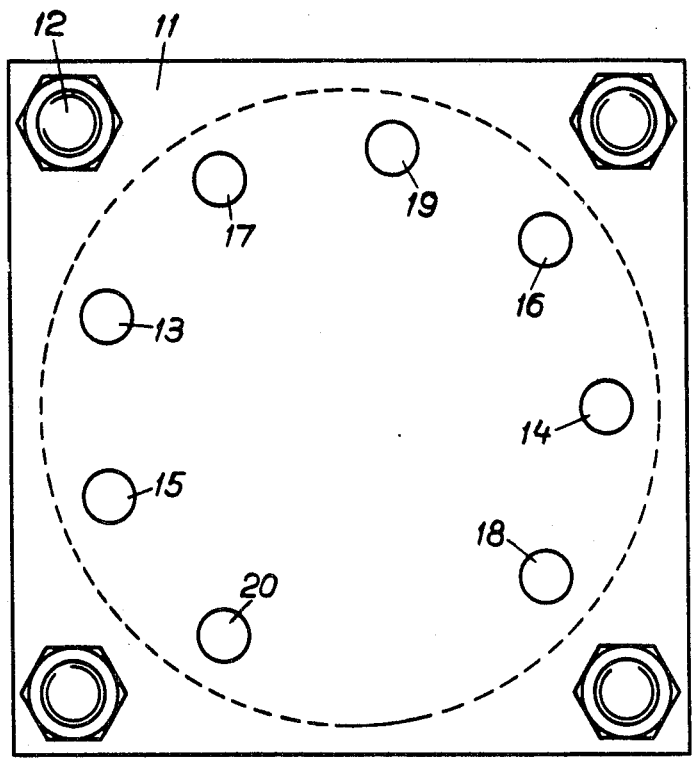
FIG. 1 shows an end view of a fuel cell battery according to the invention where the electrolyte of the fuel cell is utilized as medium in the barrier space between frame parts limiting spaces containing fuel and frame parts limiting spaces containing oxidant.

The stack of electrode elements and possible cooling elements in the fuel cell battery according to FIGS. 1–6 is surrounded at its end surfaces by two mechanically strong end plates, one of which, designated 11, is seen in FIG. 1. These end plates are joined by bolts 12 arranged in the outer parts of the stack.

The electrodes are attached in the frames in a gas-tight manner. In the case exemplified the frames consist of a chlorinated polyether. Both the electrodes and their frames have circular external boundaries. In the peripheries of the frames channels are arranged having circular cross section to supply gaseous fuel 13, in the example shown hydrogen to remove excess hydrogen 14, to supply gaseous oxidant 15, in the example shown oxygen, to remove excess oxygen 16, to supply electrolyte 17, in the example shown a water solution of potassium hydroxide, to remove electrolyte 18, and also channels for the negative and positive conductors 19 and 20, respectively. The boundaries of these channels consist at least partly of walls in holes arranged in the frames of the element in the stacking direction of the elements. The channels are in communication with hydrogen, oxygen and electrolyte spaces, respectively.

In FIGS. 2–5 the channels 13, 15 and 17 for the supply of hydrogen, oxygen, electrolyte and a channel 19 for the arrangement of current conductors for the hydrogen electrodes, have been described in more detail. Channels 14, 16 and 18 for the removal of hydrogen, oxygen and electrolyte may be made in the same way as the respective supply channels. The channel 20 for the arrangement of current conductors for the oxygen electrode may be the same as the channel 19.

FIGS. 2–5 show sections in the stacking direction through a fuel cell battery containing a number of cell units. A hydrogen gas element is built up of the hydrogen electrode 26 attached in the thermoplastic resin frame 27 and an oxygen gas element of the oxygen electrode 28 attached in the thermoplastic resin frame 29. The hydrogen electrode may be manufactured of nickel activated, for example with platinum, and the oxygen electrode of nickel activated, for example with silver. The thermoplastic resin frames are provided with bellows 30 to equalise dimensional alterations in the system.

End elements 31 and 32 of thermoplastic resin are arranged nearest the metal end plates 11. These elements contain circular depressions 39 intended as O-rings which seal the end elements against the end plates or against other fuel cell stacks of the type shown.

The spaces between elements containing hydrogen are designated 33, spaces containing oxygen are designated 34 and spaces containing electrolyte, 35.

Figure 2:
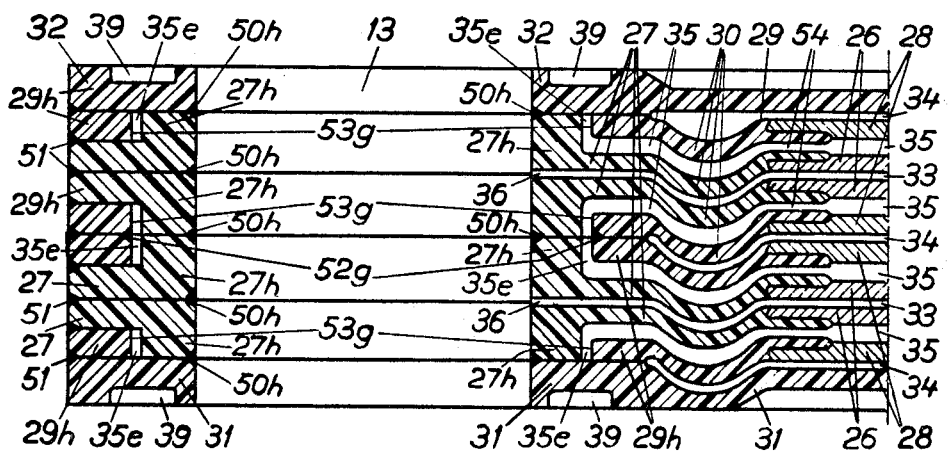
FIG. 2 shows in a section in the stacking direction, a part of the fuel cell battery according to FIG. 1 in the region around the fuel channel, FIG. 3 in a section in the stacking direction, a part of the feul cell battery according to FIG. 1 in the region around the oxidant channel, FIG. 4 in a section in the stacking direction, a part of the fuel cell battery according to FIG. 1 in the region around the electrolyte channel, FIG. 5 in a section in the stacking direction, a part of the fuel cell battery according to FIG. 1 in the region around a current conductor and FIG. 6 in a section in the stacking direction, a part of a modified fuel cell battery according to FIG. 1 which contains cooling elements.

The hydrogen channel 13 is limited in accordance with FIG. 2, apart from by the end elements, by parts 27h of the frames 27 of elements adjacent only to spaces 33 containing hydrogen and spaces 35 or 35e containing electrolyte. Between the hydrogen channel 13 or other spaces 33 containing hydrogen and spaces 34 containing oxygen there is always a space 35 or 35e containing electrolyte which is sealed both to spaces containing hydrogen and to spaces containing oxygen. Through openings 36 the hydrogen channel 13 is in communication with spaces 33. The spaces 35 and 35e are in communication with each other through the gaps 54 between the thermoplastic resin frames. The spaces designated 35e are barrier spaces.

Figure 3:
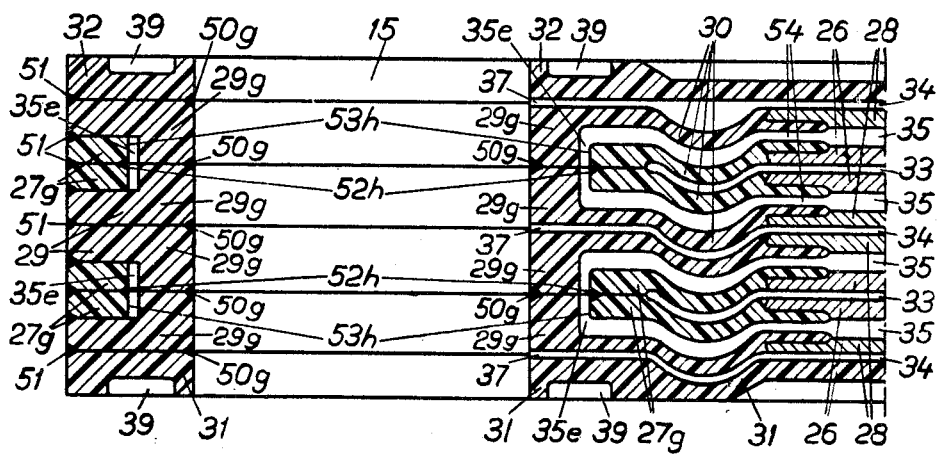

The oxygen channel 15 is limited according to FIG. 3, apart from by the end elements, by parts 29g of the frames 29 of elements adjacent only to spaces 34 containing oxygen and spaces 35 or 35e containing electrolyte. Between the oxygen channel 15 or other spaces 34 containing oxygen and the spaces 33 containing hydrogen, there is always a space 35 or 35e containing electrolyte which is sealed both with respect to spaces containing hydrogen and spaces containing oxygen. The oxygen channel 15 is in communication with the spaces 34 through openings 37.

Figure 4:
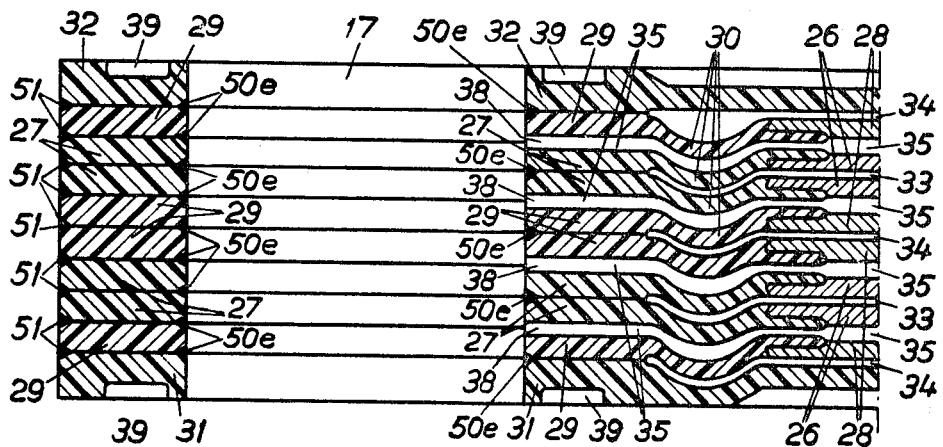

The electrolyte channel 17 is limited according to FIG. 4, apart from by the end elements, by parts of the frames 27 and parts of the frames 29. Between a space 33 containing hydrogen and a space 34 containing oxygen there is always a sealed space 35, containing electrolyte. The electrolyte channel 17 is in communication with the spaces 35 through openings 38.

Figure 5:
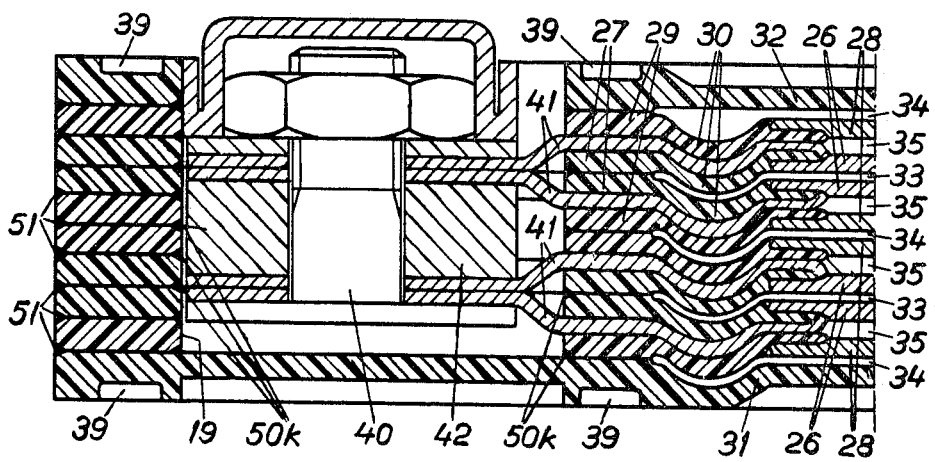

FIG. 5 shows a conductor 40 for the hydrogen electrodes 26 with branch conductors 41 arranged in openings of the same type as the openings 38 to the electrolyte spaces 35. The conductor is arranged in the channel 19 which is hermetically sealed with respect to the spaces 33 and 34 containing hydrogen and oxygen. 42 designates metal inserts acting as spacers to position the branch conductors 41 at the correct distance from each other.

The separate elements are joined to each other by circular connections 50 around the holes which together form the channels, by connections 51 around the periphery of the element and by connections 52 around the circular apertures 53 of those elements which are blocked from connection to the channel in question. Circular connections around the hydrogen channel 13 are designated 50h, around the oxygen channel 15, 50g, around the electrolyte channel 17, 50e and around the conductor 40 for the hydrogen electrodes, 50k. Circular apertures in hydrogen elements are designated 53h and the connections around them 52h. Circular apertures in oxygen elements are designated 53g and the connections around them 52g. The barrier space 35e containing electrolyte is annular. It extends between the parts in the electrode element which limit an aperture 53 and adjacent frame parts of electrode elements of a different type from those in which the apertures themselves are arranged. The annular barrier space 35e is thus limited at a hydrogen channel 13 by the frame parts 27h of the frames 27 of the hydrogen elements and by the frame parts 29h of the frames 29 of the oxygen elements and at an oxygen channel 15 by frame parts 27g of the frames 27 of the hydrogen elements and by frame parts 29g of the frames 29 of the oxygen elements.

The elements can be joined together in the manner described for joining electrode elements to thermoplastic resin frames in French Pat. No. 1,417,728.

When the active electrodes 26 and 28, respectively, have been inserted in the thermoplastic resin frames 27 and 29, respectively, by melting, the elements thus formed are welded together into units, each having two electrodes of the same type and an inner gas space between them. The two oxygen elements are then welded together around the apertures 53g around the hydrogen channels 13 and 14, that is at the frame parts 29h, thus providing sealed connections 52g, at the periphery providing sealed connections 51, at the conductors 19 and 20 and at the electrolyte channels 17 and 18, forming sealed connections 50k and 50e. The two hydrogen elements are welded in the same way around the apertures 53h around the oxygen channel, that is at the frame parts 27g effecting sealed connections 52h, at the periphery effecting sealed connections 51, at the conductors 19 and 20 and at the electrolyte channels 17 and 18 effecting sealed connections 50k and 50e.

These prefabricated elements are then stacked on one another and then joined together at the channels 13, 14, 15, 16, 17 and 18, effecting sealed connections 50h, 50g and remaining connections 50e and 50k. Openings 36 are left at the hydrogen channel for communication between the hydrogen channel 13 and spaces 33 for hydrogen, openings 37 at the oxygen channel for communication between the oxygen channel 15 and spaces 34 for oxygen and openings 38 at the electrolyte channel for communication between the electrolyte channel 17 and spaces 35 for electrolyte.

The cells may be parallel or series-connected.

Figure 6:
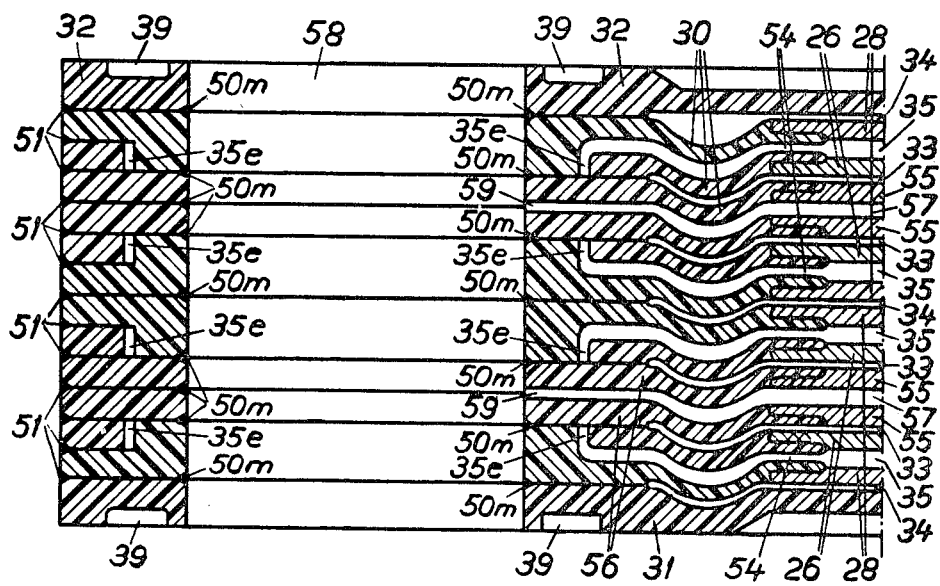

In the embodiment shown in FIG. 6 the fuel cell battery also includes cooling elements. A cooling element is formed of the active cooling member 55, for example in the form of a solid metal plate, for example a nickel plate, attached in the thermoplastic resin frame 56. Spaces between elements containing coolant are designated 57. The coolant, which may be water, is supplied through the channel 58 and openings 59 to the spaces 57. The channel for removing coolant may be shaped the same as the supply channel. Sealings around the coolant channel are designated 50m.

Otherwise the designations from FIGS. 1–5 are retained for corresponding parts in FIG. 6.

In the fuel cell battery shown in FIGS. 7–13 the material effecting a barrier between spaces containing oxidant and spaces containing fuel, consists in one example of nitrogen, the fuel of hydrogen and the oxidant of oxygen.

Figure 9:
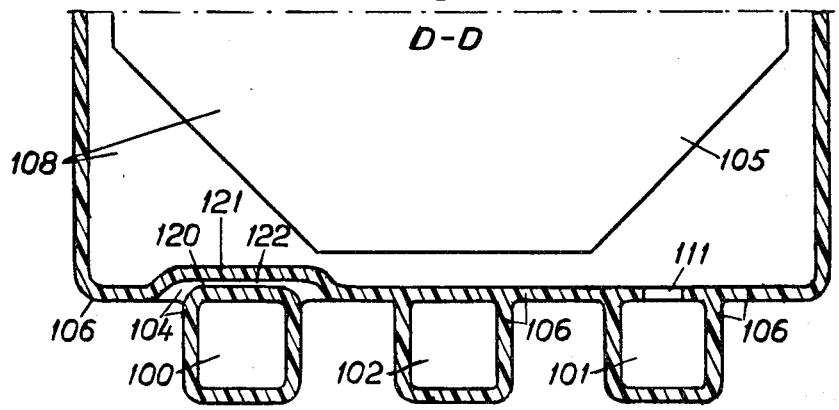
Figure 10:
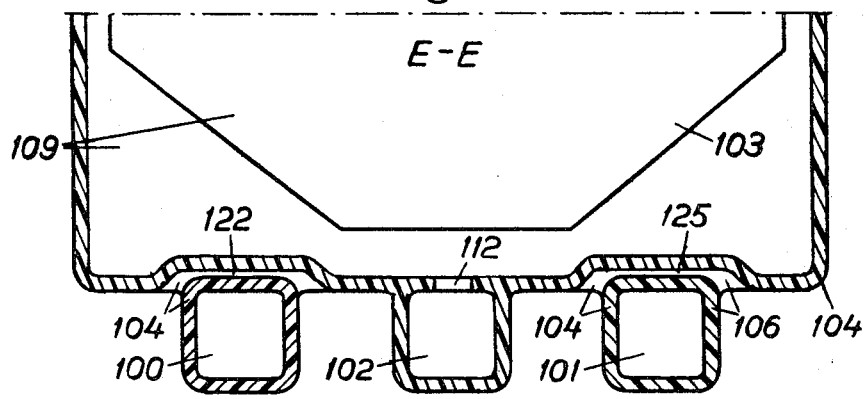
Figure 11:
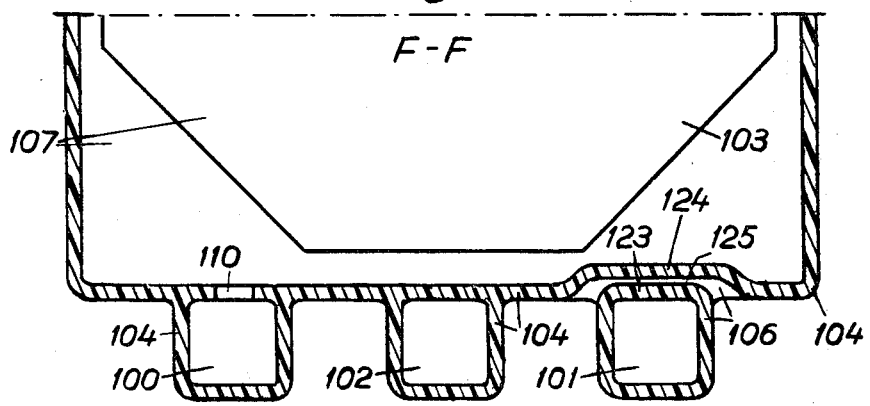
Figure 12:
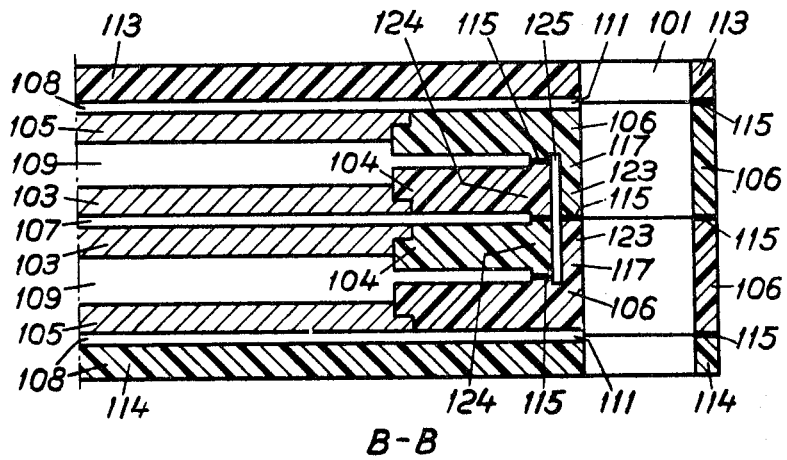
Figure 13:
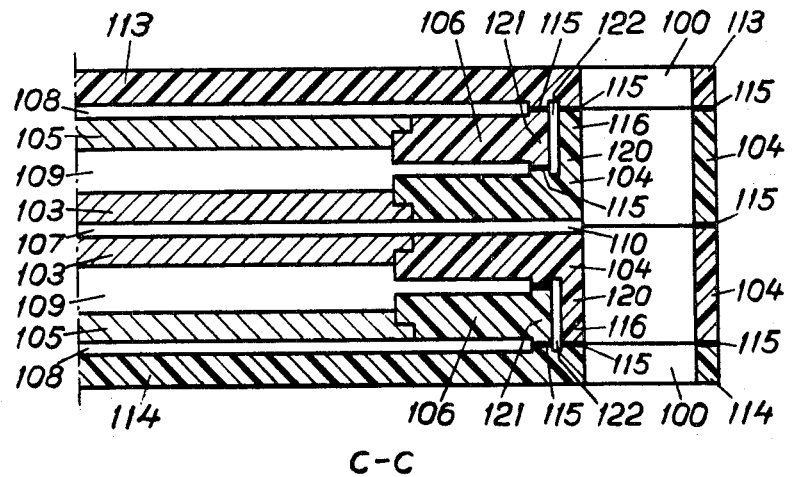

FIG. 7 shows an end view of the part of the fuel cell battery situated nearest the supply channels for hydrogen, oxygen and electrolyte, FIG. 8 a section A—A through the arrangement according to FIG. 7 in stacking direction of the elements, FIG. 9 the section D—D of FIG. 8 perpendicular to the stacking direction, FIG. 10 the section E—E of FIG. 8, perpendicular to the stacking direction, FIG. 11 the section F—F in FIG. 8 perpendicular to the stacking direction, FIG. 12 the section B—B in FIG. 7 through an oxidant channel in the stacking direction of the elements and FIG. 13 the section C—C in FIG. 7 through a fuel channel in the stacking direction of the elements.

In FIGS. 7–13 the channel for supplying hydrogen is designated 100, the channel for supplying oxygen 101 and the channel for supplying electrolyte, in this case potassium hydroxide, is designated 102.

The hydrogen electrode is designated 103, its thermoplastic resin frame 104, the oxygen electrode 105 and its thermoplastic resin frame 106. The spaces containing hydrogen are designated 107, spaces containing oxygen 108 and spaces containing electrolyte 109. Inlet openings for hydrogen from the hydrogen channel are designated 110, inlet openings for oxygen from the oxygen channel, 111 and inlet openings for electrolyte from the electrolyte channel 112. End elements for the battery are designated 113 and 114. The connections between the thermoplastic resin frames, designated 115, consist in the exemplified case of welded joints formed by melting together electrode elements facing each other.

In the figures the section surfaces are sectioned in the normal manner, whereas the joint surfaces of the thermoplastic resin frames are indicated by lines crossing to form a diamond pattern. In FIGS. 9 and 11, therefore, all shown surfaces of the plastic frames are joint surfaces, whereas in FIG. 10 the plastic frame surfaces around the hydrogen channel 100 and oxygen channel 101 are section surfaces. It is clear from the figures that the thermoplastic resin frames 104 of the hydrogen electrodes around the hydrogen channel 100 have parts 116 projecting into apertures in the frames of the oxygen electrodes and completely blocking these last mentioned frames from contact with the hydrogen channel and that the thermoplastic resin frames 106 of the oxygen electrodes have parts 117 projecting into apertures in the frames of the hydrogen electrodes and completely blocking these last mentioned frames from contact with the oxygen channel.

The elements in the exemplified battery are joined by first joining together the two elements with hydrogen electrodes at all common joint surfaces on the frames. After this on each side of the product so formed is arranged an element with an oxygen electrode which is joined along the joint surfaces which are common to joint surfaces of the adjacent element with a hydrogen electrode and which are common to joint surfaces of the other element with an oxygen electrode. The latter joint surfaces are situated around the oxygen channel at the parts 117. Finally the end elements 113 and 114 are attached which form joints with adjacent elements with oxygen electrodes and also with the projecting frame parts 116 of the element with a hydrogen electrode situated closest to each end element.

As is clear from FIGS. 9 and 13, a barrier space 122 is arranged between frame parts 120 situated nearest to and limiting the fuel channel 100 and adjacent frame parts 121 limiting the oxidant spaces 108, which barrier space is sealed to the fuel channel 100 and to the oxidant spaces 108. Nitrogen is led continuously through this barrier space.

FIGS. 11 and 12 show clearly that a barrier space 125 is arranged between frame parts 123 situated nearest to and limiting the oxidant channel 101 and frame parts 124 limiting adjacent fuel spaces 107, which barrier space is sealed to the oxidant channel 101 and to the fuel spaces 107. Nitrogen is led continuously through this barrier space. The flow of nitrogen through the barrier spaces 122 and 125 may be effected by supplying the stack of elements externally with nitrogen.

Channels for the removal of hydrogen, oxygen and electrolyte may be the same shape as the supply channels. Channels for the supply and removal of possibly used coolant and channels for electrical connections and their arrangement may be analoguous with the method shown in FIGS. 5 and 6 for the battery according to FIGS. 1–6.

Instead of leading nitrogen, carbon dioxide or other inert gas through the barrier spaces 122 and 125, water or some other inert liquid can be led through these barrier spaces. It is also possible to arrange a solid material in the barrier spaces 122 and 125, for example a casting resin, such as an epoxy resin. This is applied in the barrier space in liquid form and suitably adapted to fill the whole space, after which it is solidified by curing and thus acts as a separate separating wall fixed to adjoining frame parts.

In fuel cell batteries where O-rings are used as sealing elements instead of melted thermoplastic the present invention can, of course, be used with the same advantageous results.

I claim:

1. Fuel cell battery comprising several electrode elements, each of said electrode elements comprising a frame and an active electrode fixed in said frame, which elements are stacked to form a body with intermediate spaces between said electrodes and with sealing connections arranged between adjacent frames to form the boundary of the intermediate space therebetween, said frames having holes therein forming channels therein extending substantially perpendicular to the electrodes and connected to said intermediate spaces for delivery of gaseous fuel, gaseous oxidant and electrolyte wherein one channel, the fuel channel, for the delivery of the gaseous fuel is arranged in connection with spaces, fuel spaces, which at least on one side are limited by an electrode element with an electrode which is active in a reaction between the fuel and the electrolyte, one channel, the oxidant channel for the delivery of the gaseous oxidant is arranged in connection with spaces, oxidant spaces, which at least on one side are limited by an electrode element with an electrode which is active in a reaction between the oxidant and the electrolyte, and one channel, the electrolyte channel, for the supply of the electrolyte is arranged in connection with spaces, electrolyte spaces, between an electrode element with an electrode which is active in a reaction between the fuel and the electrolyte and an electrode element with an electrode which is active in a reaction between the oxidant and the electrolyte in which a barrier space is arranged between frame parts situated nearest to and limiting the oxidant channel and adjacent frame parts limiting the fuel spaces, which barrier space is sealed with respect to the oxidant channel and to the fuel spaces and in which a material is arranged which prevents leakage of oxidant and/or fuel into the barrier space or prevents oxidant and fuel which has leaked into the barrier space from reacting with each other, and that a barrier space is arranged between frame parts situated nearest to and limiting the fuel channel and adjacent frame parts limiting the oxidant spaces, which space is sealed with respect to the fuel channel and to the oxidant spaces and in which a material is arranged which prevents leakage of oxidant and/or fuel into the barrier space or prevents oxidant and fuel which has leaked into the barrier space from reacting with each other.

2. Fuel cell battery according to claim 1, characterised in that at least one cooling element comprising a frame and an active cooling means fixed in said frame is stacked with the electrode elements.

3. Fuel cell battery according to claim 1, characterised in that the fuel channel is limited by frame parts in elements with no contact with the oxidant and that the oxidant channel is limited by frame parts in elements with no contact with the fuel.

4. Fuel cell battery according to claim 1, characterised in that the material arranged in a barrier space comprises a solid body formed in the barrier space.

5. Fuel cell battery according to claim 1, characterised in that the material arranged in a barrier space comprises a cured body of a casting resin.

6. Fuel cell battery according to claim 1, characterised in that the material arranged in a barrier space comprises a liquid or gaseous medium which can be transported through the barrier space.

7. Fuel cell battery according to claim 6, characterised in that the liquid medium comprises of the electrolyte of the fuel cell.

8. Fuel cell battery according to claim 6, characterised in that the gaseous medium comprises a gas, which is inert in relation to the fuel and in relation to the oxidant.

References Cited

UNITED STATES PATENTS

| | | | |
|---|---|---|---|
| 3,126,302 | 3/1964 | Drushella | 136—86 |
| 3,188,242 | 6/1965 | Kordesch et al. | 136—86 |
| 3,202,546 | 8/1965 | Rightmire et al. | 136—86 |
| 3,206,332 | 9/1965 | Juda | 136—86 |
| 3,320,092 | 5/1967 | Uline | 136—86 |

ALLEN B. CURTIS, Primary Examiner